United States Patent [19]

Zelahy

[11] 4,012,616
[45] Mar. 15, 1977

[54] METHOD FOR METAL BONDING

[75] Inventor: John W. Zelahy, Cincinnati, Ohio

[73] Assignee: General Electric Company, Cincinnati, Ohio

[22] Filed: Jan. 2, 1975

[21] Appl. No.: 538,158

[52] U.S. Cl. .............................. 219/9.5; 219/10.79
[51] Int. Cl.² ......................................... B23K 13/00
[58] Field of Search ............ 219/9.5, 7.5, 8.5, 104, 219/150, 154, 95, 10.79

[56] References Cited

UNITED STATES PATENTS

| | | | |
|---|---|---|---|
| 2,649,527 | 8/1953 | Chapman et al. | 219/9.5 X |
| 2,763,756 | 9/1956 | Rudd et al. | 219/9.5 |
| 2,805,316 | 9/1957 | Chapman | 219/9.5 X |
| 2,928,923 | 3/1960 | Rietsch | 219/9.5 |
| 3,560,693 | 2/1971 | Morin, Jr. | 219/95 X |
| 3,872,275 | 3/1975 | Rudd | 219/9.5 X |

OTHER PUBLICATIONS

Welding Handbook, Section 2; Sixth Edition; "Welding Processes," American Welding Society, Edited Arthur L. Phillips, p. 27.22.

Primary Examiner—Thomas J. Kozma
Attorney, Agent, or Firm—Lee H. Sachs; Derek P. Lawrence

[57] ABSTRACT

Simple or complex cross-sectional configuration metal components of an article are bonded together through a forged joint with application of localized high frequency induction heating combined with high energy rate impacting of the metal components together. An improved induction heating and impacting apparatus is provided, including an induction heating element the shape of which varies with substantial variations in the cross-sectional area of each component to provide substantially uniform heating.

5 Claims, 8 Drawing Figures

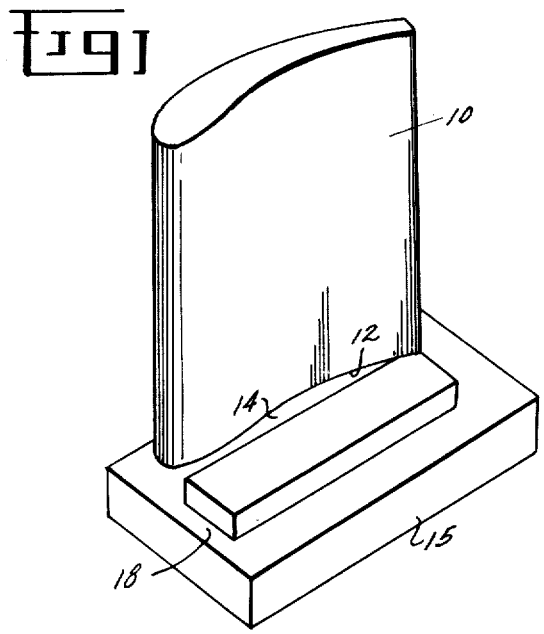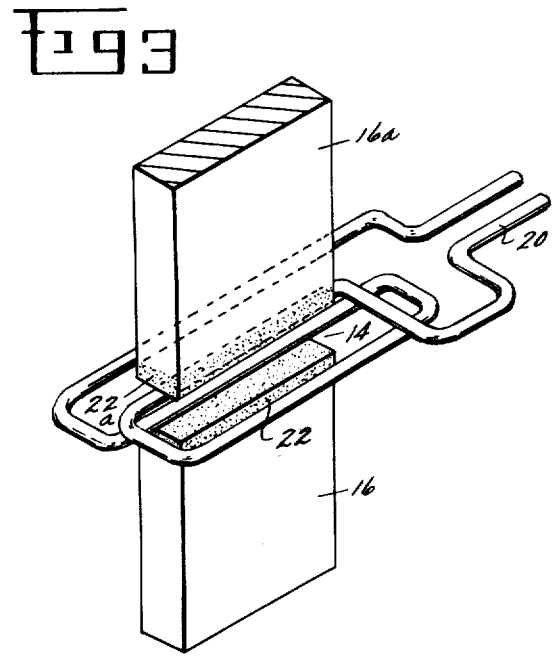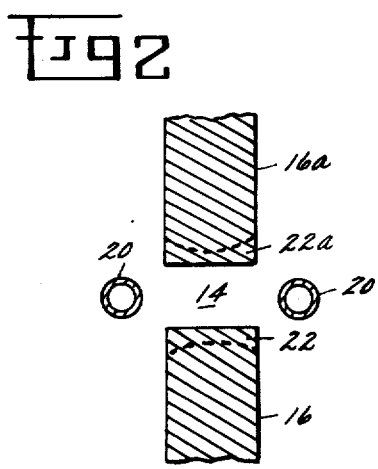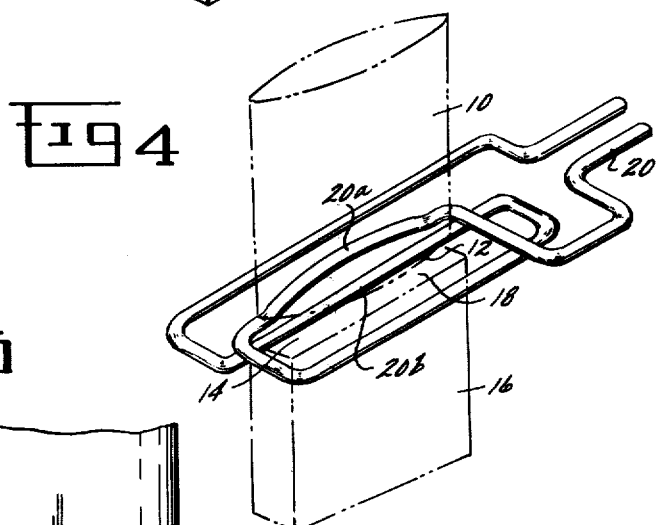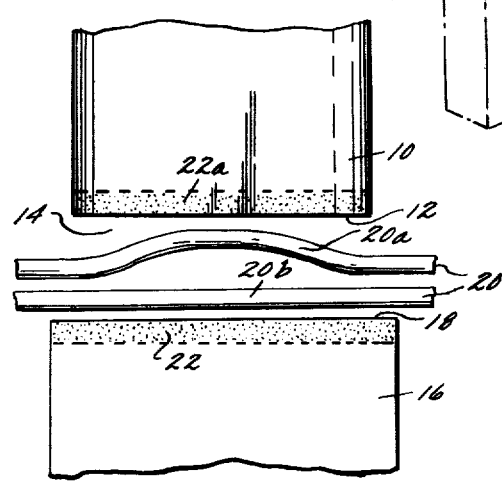

METHOD FOR METAL BONDING

The invention herein described was made in the course of or under a contract, or a subcontract thereunder, with the United States Department of the Air Force.

BACKGROUND OF THE INVENTION

This invention relates to the metallurgical bonding of metal components and, more particularly, to the use of a combination of heating and impacting to provide a forged joint.

The technique of pressure bonding or welding together cooperating metal components is most advantageously conducted by localized heating of the cooperating surfaces followed by pressing of the surfaces together. In order to provide for such localized or controlled depth heating and still allow for pressing of the heated portions together, known methods have used high frequency resistance heating to heat the joint surfaces rapidly to a shallow depth while the surfaces to be joined are in contact one with the other. The high frequency resistance current is introduced with electrical contacts, such as of copper. When the electrical power is applied, the current then travels along each face, thus heating the entire joint length. When a preselected bonding temperature has been reached, application of electrical power is terminated and the components are pressed together. Such a method and its associated apparatus is shown in one form in U.S. Pat. No. 3,591,757 — Rudd patented July 6, 1971.

Although such known methods can produce joints with parent metal mechanical properties, they are amenable only to specimens with rectangular cross section. Since such processes rely on close part-to-power contact fit-up, difficulties have arisen in connection with reproducability when bonding non-rectangular cross sections, for example an airfoil cross section.

SUMMARY OF THE INVENTION

One principal object of the present invention is to provide an improved method for metallurgically bonding metal components of nonrectangular cross sections to provide mechanical properties substantially the same as that of the parent metal.

Another object is to provide improved apparatus for a combination of localized induction heating and high energy rate forging.

These and other objects and advantages will be more fully understood from the following detailed description, the drawings and the examples, all of which are intended to be typical of rather than in any way limiting on the scope of the present invention.

Briefly, the method associated with the present invention for metallurgically bonding a plurality of metal components at cooperating interface portions includes first positioning the cooperating portions opposite one another with a space or gap therebetween. High frequency induction heating is then applied to the interface portions from within the space or gap to heat the portions to a temperature which is less than that which will detrimentally affect the metal of the components but at the same time heats them to a temperature at which metal upset can occur. Then the opposed portions are impacted together at a high energy rate with a force sufficient to upset each of the portions and to expel metal from each component from between the impacting portions. This produces a forged joint with mechanical properties substantially equal to those of the parent metal of the components.

The apparatus associated with the present invention includes a holding means to hold the components in spaced apart relationship with cooperating interface portions opposing one another across a gap, as well as high energy rate force means to impact the components together at the interface portions. The apparatus also includes an induction heating means including a heating element to heat the portions, the shape of the heating element varying as a function of substantial variations in the cross-sectional area of each interface portion to provide substantially uniform heating in each portion. Also provided is means to move the heating element for insertion into and withdrawal from the gap.

BRIEF DESCRIPTION OF THE DRAWINGS

FIG. 1 is a perspective view of a pair of cooperating metal components positioned for bonding;

FIG. 2 is a sectional view of cooperating components with induction heating coils out of position according to the present invention;

FIGS. 3 and 4 are perspective views of cooperating components with induction heating coils positioned in accordance with embodiments of the present invention;

FIG. 5 is a fragmentary, sectional view of the embodiment of FIG. 4;

DESCRIPTION OF THE PREFERRED EMBODIMENTS

Figure 6:
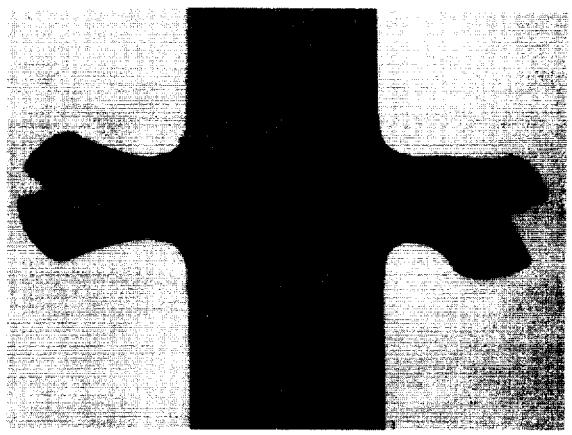
FIG. 6 is a photomicrograph at 6 magnifications of a cross section of two components joined according to the present invention.

In the manufacture of certain power producing apparatus, such as gas turbine engines, it was recognized that significant cost reductions could be realized in the manufacture of components if parts could be fabricated from separate components rather than being machined from larger forgings. The methods of friction welding and of diffusion bonding were capable of producing joint strengths sufficient for such component fabrication. However, both of such processes have their shortcomings: friction welding is very difficult or impossible with irregularly shaped parts and diffusion bonding is expensive and time consuming.

The metallurgically bonded portion produced by the present invention, which combines localized heating through induction and impact-type pressure bonding, is similar to a friction welded joint in that both are produced by shallow heating at temperatures below the parent metal melting point, at the joint interface surface portions, in combination with an externally applied pressure to provide a forged joint microstructure. As was mentioned before, the known method involving use of high frequency resistance heating combined with pressing of the contacting cooperating surfaces together presents significant problems when at least one of the cooperating surfaces is of a non-rectangular cross section.

Shown in FIG. 1 is a pair of metal components having a cross-sectional shape different one from the other but which can be advantageously metallurgically bonded according to the present invention. Airfoil 10 having a cooperating surface 12 is shown positioned across a gap or space 14 from an enlarged rectangular member 15 including cooperating surface 18 which cooperates with surface 12.

In an initial evaluation of the use of induction heating rather than resistance heating to heat the component portion inwardly from cooperating surfaces prior to bonding, an induction heating element or coil 20 in FIG. 2 was placed outwardly from gap 14. It was intended that the gap be rapidly closed when the cooperating components reached a desired temperature. The cooperating members 16 and 16a in FIG. 2 each were of rectangular cross section. It was recognized, however, that with such an arrangement of the coils outside of gap 14, there was a tendency to heat the outer surface portion to a greater depth than the inner surface portion, as shown by the broken lines in FIG. 2. It was also recognized that with the coils in the position shown in FIG. 2, variations in shape or size of induction heating coil 20 could not adequately provide uniform heating of cooperating interface portions 22 and 22a. In this initial work involving the joining of titanium alloys and superalloys, the gap in FIG. 2 was maintained at about 1/8 to 1/4 inch apart. Power was applied to induction coil 20 and the cooperating interface portions 22 and 22a were heated to the desired bonding temperature. The power to coil 20 was terminated and pressure was applied to impact cooperating interface portions 22 and 22a together. The problems of undesirably deep heat penetration and uneven heat pattern precluded obtaining a uniform upset of cooperating interface portions 22 and 22a. Also, a relatively slow heat-up rate was recognized.

The arrangement of the perspective view of FIG. 3 according to the present invention, with coil 20 disposed as shown in gap 14 between the cooperating interface portions 22 and 22a, resulted in uniform heating and a uniform upset of such portions as well as a faster, localized heating rate and hence a shallower depth of heat penetration. In the arrangement of FIG. 3, after the desired bond temperature was reached in portions 22 and 22a, the coil 20 was retracted from gap 14 and the members 16 and 16a were impacted together across the gap between them to provide the metallurgical bond.

Because heating element or coil 20, according to the present invention, is disposed within gap 14, its shape can be varied to cooperate with the cross-sectional area of each of the interface portions to provide substantially uniform heating in each portion. Such an arrangement is shown in the fragmentary perspective view of FIG. 4 and the fragmentary, sectional view of FIG. 5 involving the joining of an airfoil-shaped member 10 and a rectangular-shaped member 16. For clarity of presentation, airfoil member 10 and rectangular member 16 are shown in phantom. Because of the varying cross-sectional area of airfoil 10, induction heating of its cooperating interface portion 22a through surface 12 would be more rapid in the thinner cross-sectional portion. Therefore, portion 20a of coil 20 is shaped to be closer to the thicker portions than to the thinner portions. However, because the cross-sectional area of rectangular member 16 is substantially uniform, portion 20b of coil 20 need not be so configured and can be a relatively straight portion. This arrangement is more apparent in the view of FIG. 5.

Because of the interposition of an induction heating element within gap 14 but not touching either of the members to be joined, the heating element shape and proximity to the component which it is intended to heat can be controlled to produce uniform heating without excessive heating of thin edges. Through the present invention, rapid heating of the cooperating interface portions can be accomplished thus limiting the depth of penetration of heat into the components to be joined. In addition, the application of induction heating through a means which does not require contact of the surfaces to be heated, as is the case in the use of resistance heating, enables heating element insertion into and withdrawal from the gap between the members in a rapid manner. This allows rapid application of a high energy rate force to impact the cooperating interface portions together, thus avoiding heat losses in the processing and avoiding the need to heat the interface portions at a temperature higher than that which might be desired. Since only local heating occurs, the bulk of the components and all of the tooling, which is required to hold and to move the components, remains at ambient temperature and are rigid during bonding. Thus greater accuracy is provided.

As was mentioned above, the present invention has been evaluated particularly in connection with titanium alloys and the superalloys usually used in gas turbine engines. Such superalloys include alloys based on Fe, Ni or Co. One titanium-base alloy which was extensively evaluated is the commercially available 6 wt. % Al - 4 wt. % V - balance Ti, sometimes referred to as Ti-6-4 alloy. Pressure bonded joints were made between components of such alloy, one component having an airfoil-shaped cross section and the other having a rectangular-shaped cross section. The coil and component arrangement was similar to that shown in FIGS. 4 and 5. In order to further enhance uniformity of heating, it is preferred that cooperating surfaces, such as 12 and 18 shown in the drawing, be substantially flat. With the cooperating components positioned in the spaced apart relationship across gap 14 as shown in FIG. 4, the cooperating interface portions were heated to a temperature of about 1750° F using a 15KW, 450 KH$_z$ power source for a time about 1 to 1½ seconds. After reaching the desired temperature, as sensed by a radiation heat sensor such as an optical pyrometer, the electrical power was terminated and the heating element was withdrawn from the gap between the two components. Immediately upon withdrawal, a hydraulic ram was actuated, causing the cooperating interface surface portions to be impacted together at a high energy rate. In this manner, the portions were plastically deformed or upset, and metal from each of the two components was expelled from between the impacting portions, effecting a solid state, forged bond. In this type of arrangement, the joint upset is controlled by tooling arrangements such as stops. In this example, the total bond cycle was accomplished in the range of about 7 - 10 seconds from heatup through cool-down, it being conducted in a vacuum to avoid contamination of the surfaces being heated. However, it has been found that such alloys as titanium can be bonded in air with a slight edge effect, for example about 0.02 inch, which can be removed from the surface. It is preferred for such other alloys as the Fe, Ni or Co superalloys that a vacuum or a non-oxidizing atmosphere be used.

In this example employing Ti-6-4 alloy components, the two portions after heating were impacted through high energy rate forging, as that term is used in the art, as contrasted with the significantly slower speed of an ordinary forge press. In such high energy rate forging, for example, the ram speed can be 100 inches/sec. or faster and can go as high as 4000 inches/sec. in explosive forging. A force of about 40,000 – 50,000 psi is preferred for use in the present invention with titanium. Similar evaluations of commercial nickel-base superalloys and of commercial iron-base alloys, such as stainless steel, have indicated that a force of about 50,000 – 60,000 psi is desirable for such alloys. In any event, the force is applied rapidly, at a high energy rate, in an amount necessary to expel metal at the processing temperature, which is less than that which will detrimentally affect the metal being joined. Through practice of the present invention heating and rapid application of pressure, employing the localized, controlled components of cast nickel-base superalloys, having an incipient melting temperature and an upset temperature very close together, can be joined without detrimentally affecting the parent metal. With such cast nickel-base superalloys, it has been found that after rapid, localized heating and the impacting to extrude material from the gap between the components being joined, the components and the extruded metal freeze almost immediately. After heat treatment, the joint according to the present invention is virtually indistinguishable from the parent metal as shown by photomicrographic studies. For use with alloys based on elements selected from Fe, Ni, Co and Ti, the preferred heating temperature is in the range of about 1600° – 2300° F, with an applied force in the range of about 30,000 – 60,000 psi.

Figure 7:
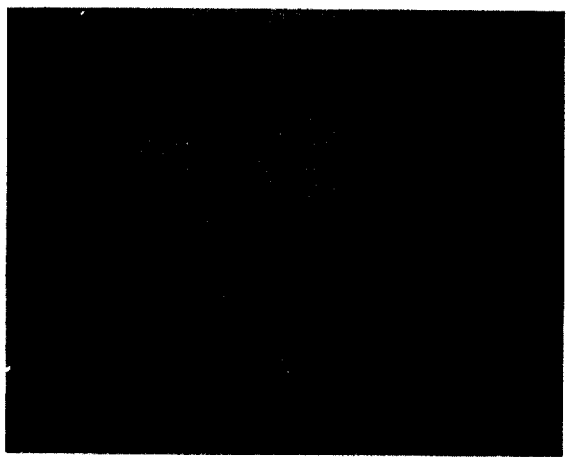
FIG. 7 is a photomicrograph at 50 magnifications of the bond area of FIG. 6.

A photomicrographic cross-sectional view at 6 magnifications of the condition of the two Ti-6-4 alloy members joined in the example discussed above is shown in FIG. 6. Because the joining was conducted in vacuum, there were no inclusions or contaminations noted in the forged joint even out to the edge of the bonded area. After joining in this manner, the flash was removed. A photomicrographic evaluation of the joint showed it to be a forged joint which appears very similar to a friction welded joint. One portion of the joint of FIG. 6 is shown in the photomicrographic cross section of FIG. 7 at 50 magnifications.

A variety of mechanical tests were conducted on pressure bonded joints obtained according to the present invention. Failures as a result of tensile, stress rupture and fatigue testing were in the parent metal in almost all cases rather than in the joint. When the metal in the joint failed in such testing, it failed substantially at the parent metal levels.

Figure 8:
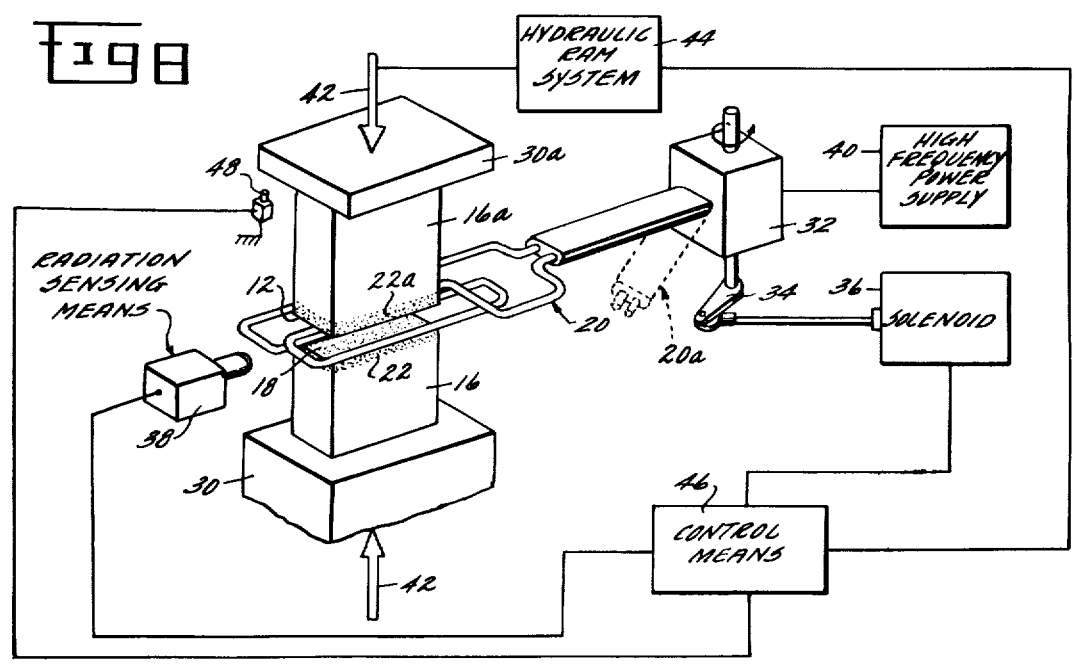
FIG. 8 is a partially diagrammatic, perspective view of one form of the apparatus of the present invention.

One form of the apparatus associated with the present invention is shown in the partially diagrammatic, perspective view of FIG. 8. In such apparatus, according to the present invention, cooperating members 16 and 16a of a type shown in FIG. 3 are held in spaced apart relationship by a holding means such as holding fixtures 30 and 30a so that their cooperating interface portions 12 and 18 are opposed one to the other across a gap or space. An induction heatng element or coil 20 is held by fixture 32 adapted, such as through a rotating pin or hinge means 34, to move the heating element 20 for insertion between the members 16 and 16a and for withdrawal from the gap between such elements to the position shown in phantom 20a in FIG. 7. Such rotation can be accomplished, for example, through the use of a solenoid 36 responsive to a radiation sensing means 38, such as an optical pyrometer, adapted to sense the temperature of cooperating interface portions 22 and 22a of the cooperating members 16 and 16a. The apparatus also includes a high frequency power supply 40, for example of the type commercially available as an induction heating unit from Cycledyne to supply electrical power to heating element or coil 20. Together the coil and power supply constitute an induction heating means. In addition, there is a high energy rate force means, indicated diagrammatically by arrows 42, for example of the type commercially available from Enerpac as Hydraulic Powered Arbor Press coupled with a Greer Olaer hydraulic accumulator providing a force in the range of about 30,000 – 60,000 psi. The high energy rate force means can be adapted to move one or preferably both of cooperating members 16 and 16a rapidly one toward the other to impact cooperating interface portions 22 and 22a together. Such a force means can be programmed, as shown in FIG. 8, to operate such as through a hydraulic ram system 44. Such a system is adapted to release or force holding means 30 and 30a one toward the other upon a signal from solenoid 36, responsive to radiation sensing means 38 into control means 46, that the desired temperature has been reached and that coil or heating element 20 has been retracted from the gap between cooperating members 16. In addition, it is preferred for accuracy to include a stop means 48 to regulate the amount of upset. Such an upset regulating means can be in a variety of forms such as, for example, simple physical stop means, more complex electronic means to sense ram position and movement and to terminate ram movement such as through termination of hydraulic fluid, etc.

As has been mentioned, it is preferable that the method associated with the present invention be conducted in a vacuum or in a nonoxidizing atmosphere. Therefore, the apparatus of FIG. 8 can be included within an ordinary vacuum or controlled atmosphere chamber, not shown, adapted to provide such conditions.

Although the coils or heating elements shown in the drawings have, for simplicity, been shown to be substantially circular in cross section, it should be understood that coils for induction heating can be made in any desired cross-sectional configuration, for example oval, rectangular, etc. In addition, for wider, more complex shaped cooperating members, there can be multiple coils of a variety of shapes and sizes. The present invention contemplates the shape of the heating element to vary with substantial variations in the cross-sectional area of each of the interface portions in a manner which provides substantially uniform heating in each portion, taking into consideration the fact that heating rates of materials vary from material to material and as a function of the power input. An important feature of the present invention is the application of induction heating within the gap between two cooperating members to be joined by impacting. This provides uniform heating at a minimum depth and avoids the various problems, both in apparatus and method, which have resulted from the use of resistance heating including the need for electrical contacts with the components to be joined and initial physical contact between the components during heat-up. Such a known arrangement, of course, precludes the use of heating means in a gap between cooperating members.

Although the present invention has been described in connection with specific examples and embodiments, it will be recognized by those skilled in the art the variations and modifications which can be made without departing from the scope of the present invention. It is intended in the appended claims to cover all such variations and modifications.

What is claimed is:

1. An improved method for metallurgically bonding a plurality of metal components at cooperating interface portions of the components, comprising the steps of:

positioning the cooperating interface portions in spaced apart opposed relationship;

applying high frequency induction heating to the interface portions from within the space between them, the heating being controlled as a function of the heating rates of the metal of the components and the cross-sectional shapes of the cooperating interface portions of the components to produce substantially uniform heating concurrently across the opposed interface portions to heat the portions to a temperature less than that which will detrimentally affect the metal of the components but at which metal upset can occur; and then impacting the opposed portions together at a high energy rate with a force sufficient to upset each opposed portion and to expel metal from each component from between the impacting portions to produce a forged joint.

2. The method of claim 1 in which:

each of the metal components is based on an element selected from the group consisting of Fe, Ni, Co, Ti and their alloys;

the portions are heated in the temperature range of about 1600° – 2300° F; and the force applied is in the range of 30,000 – 60,000 psi.

3. The method of claim 1 in which at least one of the cooperating interface portions has a cross-sectional shape other than regular.

4. The method of claim 3 in which one of the cooperating interface portions has an airfoil cross-sectional shape.

5. The method of claim 1 in which each component has a cross-sectional shape at its interface portion different from the interface portion of the cooperating portion.

* * * * *